(12) United States Patent
Liang et al.

(10) Patent No.: US 9,197,819 B2
(45) Date of Patent: Nov. 24, 2015

(54) EXPOSURE-SUPPRESSING IMAGING SYSTEM

(71) Applicant: Chung-Shan Institute of Science and Technology, Armaments Bureau, M.N.D, Taoyuan County (TW)

(72) Inventors: Chao-Wen Liang, Taoyuan County (TW); Jhe-Syuan Lin, Taoyuan County (TW); Min-Fang Lo, Taoyuan County (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 160 days.

(21) Appl. No.: 14/099,777

(22) Filed: Dec. 6, 2013

(65) Prior Publication Data

US 2015/0163389 A1 Jun. 11, 2015

(51) Int. Cl.
| | |
|---|---|
| G02B 26/00 | (2006.01) |
| G02F 1/03 | (2006.01) |
| G02F 1/153 | (2006.01) |
| G02F 1/29 | (2006.01) |
| H04N 5/235 | (2006.01) |
| H04N 5/217 | (2011.01) |
| G02B 13/22 | (2006.01) |

(52) U.S. Cl.
CPC .............. *H04N 5/2352* (2013.01); *G02B 13/22* (2013.01); *H04N 5/2173* (2013.01)

(58) Field of Classification Search
CPC ........... G02F 1/0123; G02F 1/31; G02F 1/29; G02B 26/001; G02B 26/0841; G02B 6/2766; G02B 27/283; H04N 9/3197; B60R 1/088
USPC ......... 359/239, 238, 242, 267, 290, 301–303, 359/315, 318
See application file for complete search history.

(56) References Cited

U.S. PATENT DOCUMENTS

| | | | |
|---|---|---|---|
| 2002/0176054 A1* | 11/2002 | Mihalakis | ........................ 353/31 |
| 2007/0263174 A1* | 11/2007 | Shyu et al. | ...................... 353/34 |
| 2009/0128451 A1* | 5/2009 | Tokui | ............................... 345/55 |

* cited by examiner

*Primary Examiner* — Dawayne A Pinkney
(74) *Attorney, Agent, or Firm* — Chun-Ming Shih

(57) ABSTRACT

An exposure-suppressing imaging system has a first optical assembly forming a first image of an object on a focal plane thereof, a beam splitter positioned between the first optical assembly and the focal plane of the first optical assembly; an LCOS reflective light modulator positioned on the focal plane, and selectively and partially altering the reflectivity thereof to reflect the first image back to the beam splitter; a second optical assembly positioned on a side of the beam splitter and receiving the reflected first image to form a second image on a focal plane of the second optical assembly; a light sensor converting the second image into a signal; and a controller receiving the signal computed as a third image, and selectively controlling the reflectivity of the LCOS reflective light modulator according to whether the signal contains information of overexposure on the third image.

7 Claims, 4 Drawing Sheets

EXPOSURE-SUPPRESSING IMAGING SYSTEM

BACKGROUND OF THE INVENTION

1. Field of the Invention

The present invention relates to an exposure-suppressing imaging system, and more particularly to a vehicular imaging system, which is capable of automatically suppressing overexposure regions within a captured image, especially at night, by applying a reflective light modulator in the imaging system.

2. Description of the Related Art

For most imaging systems, image capture at night is usually accompanied with an undesired light exposure within the captured image, as there may be a wide range of brightness variation to a dark environment, for example, a dark tunnel with cars using headlights. In this high-contrast situation, most of the imaging systems, such as camera, may obtain a high-contrast image in which the dark portion is extremely dark and the bright portion is extremely bright, and hence it may cause unclearness in image details.

The foregoing exposure phenomenon is commonly seen on images of driving recorders, which are usually used to capture the road images so as to record the license number for tracking the accident perpetrator. However, at nighttime, most driving recorders has low identification ability to the car license plate number, because the license plates are closed to the taillights where constructs a large brightness difference to the dark environment, and thus render the recorded license plate number unclear on the image.

The reason of the overexposure is primarily related to the CCD light sensor or the CMOS light sensor. Most CCD or CMOS sensors have a lower dynamic range than that of human eyes, meaning that the maximum/minimum light intensity recognition of the CCD or CMOS sensor is not as sensitive as the human eyes.

In view of the foregoing drawback, an imaging system suitable for nighttime use and suitable to be installed in a vehicle is expected.

SUMMARY OF THE INVENTION

The objective of the present invention is to provide an exposure-suppressing imaging system which is capable of automatically modulating the light intensity received in the imaging system and preventing overexposure from being generated in the CCD or the CMOS sensor.

In order to reach the forgoing objective, the exposure-suppressing imaging system includes a first optical assembly, a beam splitter, an LCOS reflective light modulator, a second optical assembly, a light sensor and a controller.

The first optical assembly forms a first image of an object on a focal plane thereof.

The beam splitter is positioned between the first optical assembly and the focal plane of the first optical assembly.

The LCOS (Liquid Crystal on Silicon) reflective light modulator is positioned at the focal plane, and selectively and partially alters the reflectivity thereof to reflect the first image back to the beam splitter.

The second optical assembly is positioned on a side of the beam splitter and receives the reflected first image to form a second image on a focal plane of the second optical assembly.

The light sensor positioned on the focal plane of the second optical assembly and converts the second image into a signal.

The controller receives the signal computed as a third image, and selectively controls the reflectivity of the LCOS reflective light modulator according to whether the signal contains information of overexposure on the third image.

Preferably, the first optical assembly further has a first lens having a central concavity which radius is −5.73 to −7 mm defined on a first surface thereof and a convexity which radius is −7.65 to −9.35 mm defined on a second surface thereof; a second lens having convexities respectively defined on a first surface and a second surface thereof with radiuses 17.36 to 21.21 mm and −10.86 to −13.28 mm respectively; a third lens having a central concavity which radius is −8.85 to −10.81 mm defined on a first surface thereof and a planar area defined on a second surface thereof; a fourth lens having a convexity which radius is 13.53 to 16.53 mm defined on a first surface thereof and a planar defined on a second surface thereof, in which the first lens, the second lens, the third lens and the fourth lens are sequentially centered on a common optical axis Preferably, the second optical assembly further has a fifth lens having a concavity which radius is −45.71 to −55.87 mm defined on a first surface thereof and a convexity which radius is −13.13 to −16.05 mm defined on a second surface thereof; a sixth lens having convexities which radiuses are 11.18 to 13.66 mm respectively defined on a first surface and a second surface thereof; a seventh lens coupled to the sixth lens, having a concavity which radius is −6.12 to −7.57 mm defined on a first surface thereof and a planar area defined on a second surface thereof; an eighth lens having convexities which radiuses are 6.63 to 8.1 mm and −25.43 to −31.08 mm??? respectively defined on a first surface and a second surface thereof; and a ninth lens having a central concavity which radius is −3.30 to −4.03 mm defined on a first surface thereof and a planar area defined on a second surface thereof, in which the fifth lens, the sixth lens, the seventh lens, the eighth lens and the ninth lens are sequentially centered on the common optical axis.

Given the design of the invention, when the relatively strong light sensed by the CCD or CMOS sensor in daytime or nighttime, the optical system then automatically reacts to suppress the strong part of the light but without influencing the other part of the image, and accordingly a detail information on the image can be easily read by the user.

BRIEF DESCRIPTION OF THE DRAWINGS

The invention, as well as its many advantages, may be further understood by the following detailed description and drawings in which.

DETAILED DESCRIPTION OF THE INVENTION

Figure 1:
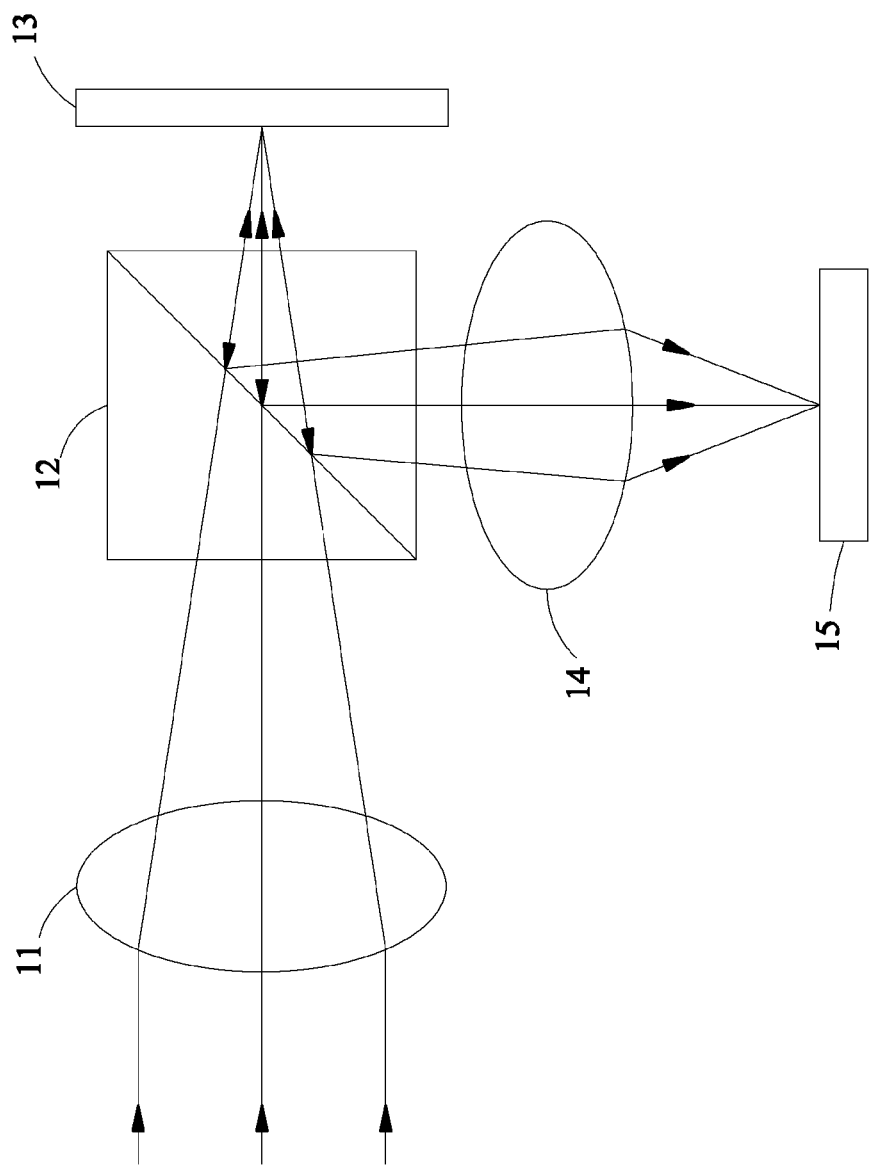
FIG. 1 is a schematic view of the exposure-suppressing imaging system in accordance with the present invention.

With reference to FIG. 1, an exposure-suppressing imaging system in accordance with the present invention has a first optical assembly 11, a beam splitter 12, a reflective light modulator 13, a second optical assembly 14 and a light sensor 15.

The first optical assembly 11 is used to collect light from the object side, and project an image on the image side.

The beam splitter 12 is securely positioned at the image side of the first optical assembly 11, and is transmittable for the light from the first optical assembly 11.

The reflective light modulator 13 is securely positioned on an imaging plane of the first optical assembly 11 to receive the light transmitting through the beam splitter 12 and reflect back to the beam splitter 12. Furthermore, the reflective light modulator 13 is capable of automatically and selectively control the reflectivity by a controller (not shown) connected therewith, in order to modulate the intensity of the reflected light. The reflective light modulator 13 may be a liquid crystal on silicon (LCOS) device, which is conventionally used in the art, and thus the detailed description thereof is omitted.

The second optical assembly 14 is securely positioned at a side of the beam splitter 12. The modulated light from the reflective light modulator 13 is then guided by the beam splitter 12 to the side and to be received by the second optical assembly 14. The second optical assembly 14 is then imaging the modulated light at the image side thereof.

The light sensor 15 is securely positioned on an imaging plane of the second optical assembly 14. The light sensor 15 converts the sensed light into a signal and sends the signal to the controller. After computation, the controller then generates a computed image for recording or for user surveillance. The signal includes information of light intensities distributed on the light sensor 15 which can be detected by the controller to determine whether the computed image is overexposed.

In the overexposure condition, the controller automatically instructs the reflective light modulator 13 to adjust the reflectivity at the corresponding reflective region. Hence, high-intensity light causing the overexposure can be reduced so as to reduce the brightness contrast on the computed image.

To take the size of the optical system that is suitable for installation in motor vehicle, the length of the entire imaging system is preferably and approximately limited to 100 mm.

Figure 2:
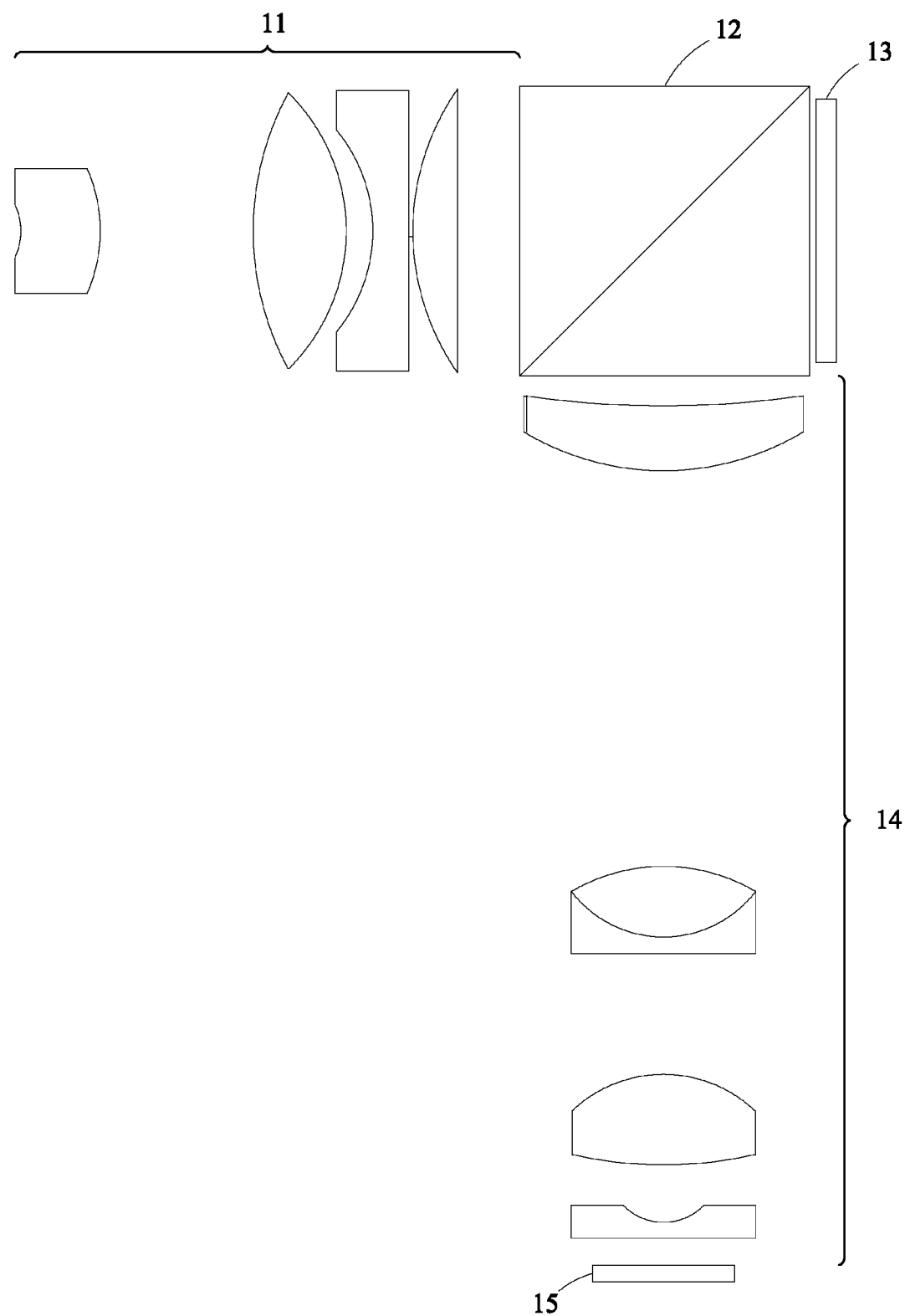
FIG. 2 is a schematic view showing the exposure-suppressing imaging system having a first optical assembly and a second optical assembly according to FIG. 1.

With reference to FIG. 2, a design of the first optical assembly 11 and the second optical assembly 14 in accordance with the present invention is shown, and herein an LCOS device is adopted as the reflective light modulator 13.

Figure 3:
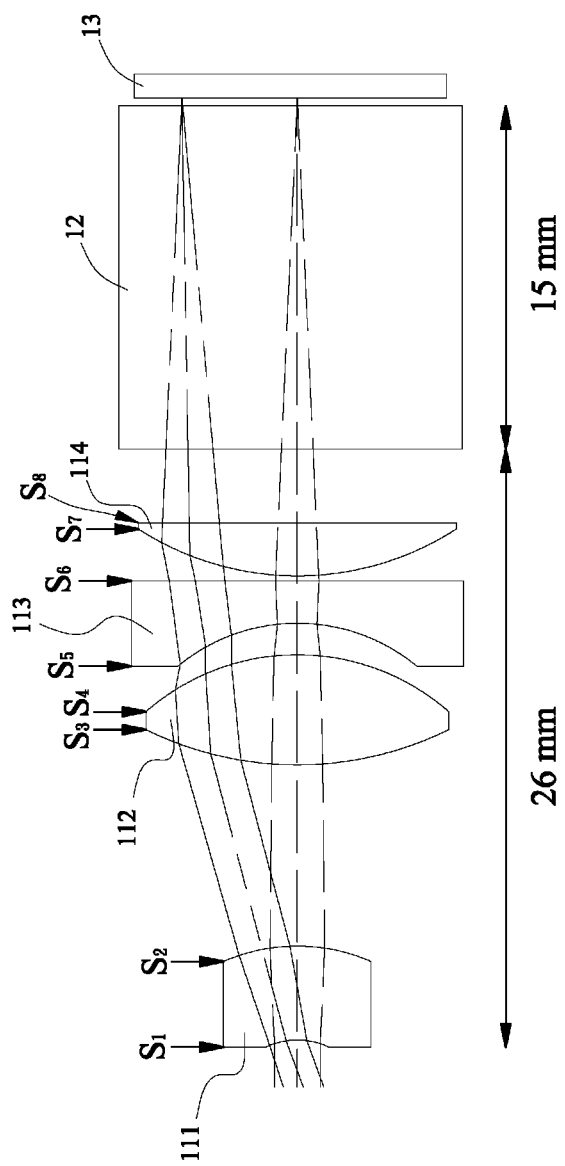
FIG. 3 is a schematic view showing the first optical assembly according to the optical system in FIG. 2 and an optical path thereof.

With reference to FIG. 3, showing the optical relationship between the first optical assembly 11 and the beam splitter 12 in FIG. 2, wherein the first optical assembly 11 consists of four lenses 111, 112, 113 and 114 sequentially arranged on a common optical axis. It can be seen in FIG. 3, the design of the first optical assembly 11 is related to a telecentric optical system, which is used to render the incident angle of the chief-ray on the LCOS modulator 13 at an angle approximating to 0°.

Specifically, lens 111 has a central concavity defined on a first surface ($S_1$) thereof and a convexity defined on a second surface ($S_2$) thereof; lens 112 has convexities respectively defined on a first surface ($S_3$) and a second surface ($S_4$) thereof; lens 113 has a central concavity defined on a first surface ($S_5$) thereof and a planar area defined on a second surface ($S_6$) thereof; and lens 114 has a convexity defined on a first surface ($S_7$) thereof and a planar defined on a second surface ($S_8$) thereof.

In the present embodiment, the first optical assembly 11 is designed to match the beam splitter 12 having an edge length about 15 mm and the LCOS modulator 13 whose diagonal length is 12.59 mm. The total length of the optical assembly 11, from the first surface of the lens 111 to an output side face of the beam splitter 12, is 26 mm or the approach. Moreover, by the design, the first optical assembly 11 has a focal length of 17 mm and a F-number (focal ratio number) of 8.

Figure 4:
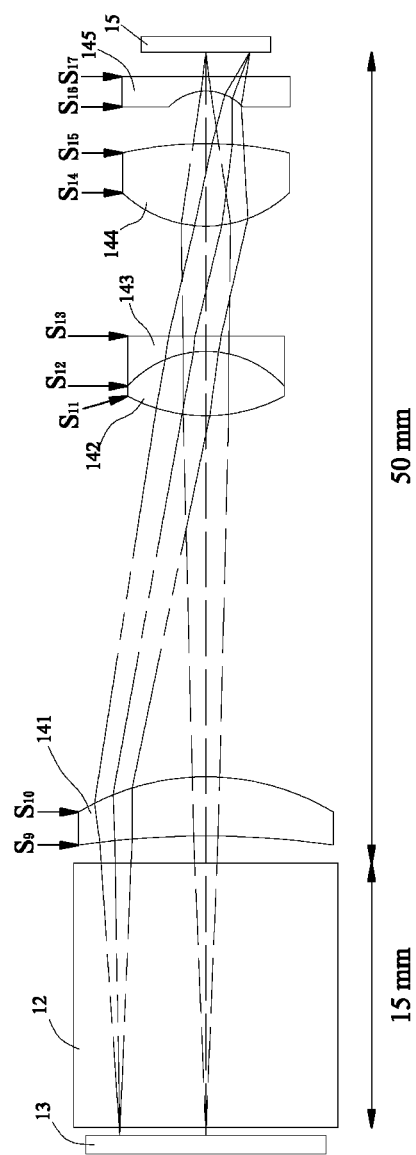
FIG. 4 is a schematic view showing the second optical assembly according to the optical system in FIG. 2 and an optical path thereof.

With reference to FIG. 4, showing the equivalent optical relationship between the beam splitter 12 and the second optical assembly 14 in FIG. 2, wherein the second optical assembly 14 consists of five lens 141, 142, 143, 144 and 145 sequentially arranged on another common optical axis.

Specifically, lens 141 has a concavity defined on a first surface ($S_9$) thereof and a convexity defined on a second surface ($S_{10}$) thereof lens 142 has convexities respectively defined on a first surface ($S_{11}$) and a second surface ($S_{12}$) thereof lens 143 has a concavity defined on a first surface ($S_{12}$) thereof and a planar area defined on a second surface ($S_{13}$) thereof lens 144 has convexities respectively defined on a first surface ($S_{14}$) and a second surface ($S_{15}$) thereof and lens 145 has a central concavity defined on a first surface ($S_{16}$) thereof and a planar area defined on a second surface ($S_{17}$) thereof. Particularly, lenses 142 and 143 are securely combined to form a doublet lens by applying adhesive between the second surface of lens 142 and the first surface of lens 143.

In the present embodiment, the second optical assembly 14 is designed to have a predetermined magnification approximating to 0.5, which means an image focused on the LCOS device is twice as large as the image focused on the light sensor 15. The total length of the second optical assembly 14, from another output side face of the beam splitter 12 to the second surface of the lens 145, is 50 mm or the approach.

The parameters of the foregoing first optical assembly 11 and the second optical assembly 14 are illustrated in Table 1 below.

| Surface name | Surface type | Radius (mm) | Thickness (mm) | Material index | Semi-Aperture |
|---|---|---|---|---|---|
| S1 | Sphere | −6.37 | 4.55 | N = 1.74 | 1.48 |
|  |  |  |  | V = 44.85 |  |
| S2 | Sphere | −8.50 | 8.9 | N = 1 | 2.79 |
| S3 | Sphere | 19.29 | 5.2 | N = 1.59 | 5.67 |
|  |  |  |  | V = 61.27 |  |
| S4 | Sphere | −12.07 | 1.5 | N = 1 | 5.82 |
| S5 | Sphere | −9.83 | 2 | N = 1.73 | 5.45 |
|  |  |  |  | V = 28.53 |  |
| S6 | Sphere | Inf. | 0.1 | N = 1 | 5.95 |
| S7 | Sphere | 15.03 | 2.64 | N = 1.59 | 6.31 |
|  |  |  |  | V = 61.27 |  |
| S8 | Sphere | Inf. | 5 | N = 1 | 6.27 |
| S9 | Sphere | −50.79 | 3.7 | N = 1.59 | 6.77 |
|  |  |  |  | V = 61.26 |  |
| S10 | Sphere | −14.59 | 22.45 | N = 1 | 7.02 |
| S11 | Sphere | 12.42 | 3.82 | N = 1.59 | 3.59 |
|  |  |  |  | V = 61.27 |  |
| S12 | Sphere | −6.88 | 1 | N = 1.73 | 3.18 |
|  |  |  |  | V = 28.53 |  |
| S13 | Sphere | Inf. | 6.79 | N = 1 | 3.00 |
| S14 | Sphere | 7.37 | 5 | N = 1.75 | 2.29 |
|  |  |  |  | V = 44.85 |  |
| S15 | Sphere | −28.26 | 3.25 | N = 1 | 2.20 |
| S16 | Sphere | −3.67 | 1 | N = 1.65 | 1.92 |
|  |  |  |  | V = 33.82 |  |
| S17 | Sphere | Inf. | 1.5 | N = 1 | 2.20 |

Table 1, lists of parameters of the first optical assembly 11 and the second optical assembly 14, in which the thickness represents a distance from a surface to a next following surface along the common optical axis, for example, a central of the surface S1 to a central of the surface S2 is 4.55 mm, the central of the surface S2 to the central of the surface S3 is 8.9 mm, and the surface S17 to the surface of the light sensor 15 is 1.5 mm. In the column of material index, N represents a refraction index of a media between a surface and a the next following surface thereof, for example, the refraction index of a media from the surface S9 to the surface S10 is 1.59, and V represents Abbe number of the lenses between a surface and a next following surface thereof, for example, the Abbe number between surfaces S16 and S17 is 33.82. The semi-aperture is the diameter of each lens relating to the amount of light entered. In the present embodiment, each radius of each lens has a limitation of 0.9 R<R<1.1 R.

According to the design of the exposure-suppressing imaging system of the present invention, for instance, a night image can be captured by forming a first image on the LCOS 13 device via the first optical assembly 11, forming a second image on the light sensor 15 via the second optical assembly 14, and computing the converted signal from the light sensor 15 via the controller.

The night image is further modified, while the controller detects overexposure information existing in the signal, which means the second image on the light sensor 15 has a wide range of brightness variation which is not be recognized by the light sensor 15 due to a poor dynamic rage thereof as mentioned. The controller then instructs the LCOS 13 to adjust the reflectivity of at least one region corresponding to the overexposure region of the light sensor 15. Accordingly, the brightness variation of the second image is rapidly and automatically reduced to meet the predetermined dynamic rang of the light sensor 15, and therefore acquire a recognized night image. This is more beneficial for users to recover an accident scene from collected evidences through the detail of a plate number or someone's facial feature.

Many changes and modifications in the above described embodiment of the invention are able to, of course, be carried out without departing from the scope thereof. Accordingly, to promote the progress in science and the useful arts, the invention is disclosed and is intended to be limited only by the scope of the invention.

What is claimed is:

1. An exposure-suppressing imaging system installed in motor vehicle comprising:
    a first optical assembly forming a first image of an object at a focal plane thereof and having:
    a first lens having a central concavity which radius is −5.73 to −7 mm defined on a first surface thereof and a convexity which radius is −7.65 to −9.35 mm defined on a second surface thereof;
    a second lens having convexities respectively defined on a first surface and a second surface thereof with radiuses 17.36 to 21.21 mm and −10.86 to −13.28 mm respectively;
    a third lens having a central concavity which radius is −8.85 to −10.81 mm defined on a first surface thereof and a planar area defined on a second surface thereof;
    a fourth lens having a convexity which radius is 13.53 to 16.53 mm defined on a first surface thereof and a planar defined on a second surface thereof,
    wherein the first lens, the second lens, the third lens and the fourth lens are sequentially centered on a common optical axis;
    a beam splitter positioned between the first optical assembly and the focal plane of the first optical assembly;
    an LCOS reflective light modulator positioned on the focal plane, and selectively and partially altering the reflectivity thereof to reflect the first image back to the beam splitter;
    a second optical assembly positioned on a side of the beam splitter and receiving the reflected first image to form a second image on a focal plane of the second optical assembly, and having:
    a fifth lens having a concavity which radius is −45.71 to −55.87 mm defined on a first surface thereof and a convexity which radius is −13.13 to −16.05 mm defined on a second surface thereof;
    a sixth lens having convexities which radiuses are 11.18 to 13.66 mm respectively defined on a first surface and a second surface thereof;
    a seventh lens coupled to the sixth lens, having a concavity which radius is −6.12 to −7.57 mm defined on a first surface thereof and a planar area defined on a second surface thereof;
    an eighth lens having convexities which radiuses are 6.63 to 8.1 mm and −25.43 to −31.08 mm respectively defined on a first surface and a second surface thereof; and
    a ninth lens having a central concavity which radius is −3.30 to −4.03 mm defined on a first surface thereof and a planar area defined on a second surface thereof,
    in which the fifth lens, the sixth lens, the seventh lens, the eighth lens and the ninth lens are sequentially centered on the common optical axis;
    a light sensor positioned on the focal plane of the second optical assembly and converting the second image into a signal; and
    a controller receiving the signal and computing the signal to generate a third image, and selectively controlling the reflectivity of the LCOS reflective light modulator according to whether the signal contains information of overexposure on the third image.

2. The exposure-suppressing imaging system as claimed in claim 1, wherein the first optical assembly has a focal length of 17 mm and a F-number of 8.

3. The exposure-suppressing imaging system as claimed in claim 1, wherein the second optical assembly has a focal length of 8.24 mm.

4. The exposure-suppressing imaging system as claimed in claim 2, wherein the second optical assembly has a focal length of 8.24 mm.

5. The exposure-suppressing imaging system as claimed in claim 1, wherein the first optical assembly is a telecentric optical imaging system.

6. The exposure-suppressing imaging system as claimed in claim 2, wherein the first optical assembly is a telecentric optical imaging system.

7. The exposure-suppressing imaging system as claimed in claim 4, wherein the first optical assembly is a telecentric optical imaging system.

* * * * *